(12) United States Patent
Pildysh

(10) Patent No.: US 6,416,691 B1
(45) Date of Patent: Jul. 9, 2002

(54) SYNTHETIC AGGREGATE AND PROCESS FOR THE PRODUCTION THEREOF

(76) Inventor: Mikhail Pildysh, 30 Douglasbank Dr., S.E., Calgary, Alberta (CA), T2Z 2B7

( * ) Notice: Subject to any disclaimer, the term of this patent is extended or adjusted under 35 U.S.C. 154(b) by 0 days.

(21) Appl. No.: 09/631,795

(22) Filed: Aug. 3, 2000

Related U.S. Application Data

(63) Continuation-in-part of application No. 09/017,772, filed on Feb. 3, 1998, now abandoned.

(30) Foreign Application Priority Data

Jan. 28, 1998 (CA) ............................................. 2228077
Jul. 27, 2000 (CA) ............................................. 2315841

(51) Int. Cl.[7] .............................................. B29B 9/08
(52) U.S. Cl. ......................... 264/7; 264/109; 588/256
(58) Field of Search .................... 264/109, 7; 588/256, 588/257

(56) References Cited

U.S. PATENT DOCUMENTS

| | | |
|---|---|---|
| 3,903,333 A | 9/1975 | Shirley, Jr. et al. |
| 3,997,355 A | 12/1976 | Santucci et al. |
| 4,024,076 A | 5/1977 | Miyake et al. |
| 4,025,352 A | 5/1977 | Luetner et al. |
| 4,058,500 A | 11/1977 | Vroom |
| 4,081,264 A | 3/1978 | Ali |
| 4,133,669 A | 1/1979 | Caldwell et al. |
| 4,134,775 A | 1/1979 | Schwoegler |
| 4,154,619 A | 5/1979 | Pronk |
| 4,188,230 A | 2/1980 | Gillott et al. |
| 4,225,353 A | 9/1980 | Beaudoin et al. |
| 4,233,082 A | 11/1980 | Simic |
| 4,239,547 A | 12/1980 | McBee et al. |
| 4,256,499 A | 3/1981 | Terrel |
| 4,269,728 A | 5/1981 | Schweitzer |
| 4,282,040 A | 8/1981 | Schneider |
| 4,293,463 A | 10/1981 | Vroom |
| 4,311,826 A | 1/1982 | McBee et al. |
| 4,340,396 A | 7/1982 | Robinson-Todd |
| 4,348,233 A | 9/1982 | Simic |
| 4,391,969 A | 7/1983 | McBee et al. |
| 4,394,150 A | 7/1983 | Garrison, Jr. et al. |
| 4,428,700 A | 1/1984 | Lenneman |
| 4,494,976 A | 1/1985 | Backlund |
| 4,569,859 A | 2/1986 | Zaharko |
| 4,636,242 A | 1/1987 | Timmons |
| 4,769,288 A | 9/1988 | Saylak |
| 5,004,799 A | 4/1991 | Kohls et al. |
| 5,342,442 A | 8/1994 | Nechvatal |
| 5,347,072 A | 9/1994 | Adams |
| 5,372,729 A | 12/1994 | Hooykaas |
| 5,500,044 A | 3/1996 | Meade |
| 5,562,589 A | 10/1996 | Adams |
| 5,562,590 A | 10/1996 | Caza |
| 5,569,153 A | 10/1996 | Mallow et al. |
| 5,584,792 A | 12/1996 | Webster |
| 5,678,234 A | 10/1997 | Colombo et al. |
| 5,935,618 A | * 8/1999 | Ikari et al. .................. 425/145 |

FOREIGN PATENT DOCUMENTS

| | | |
|---|---|---|
| CA | 1100534 | 5/1981 |
| CA | 1186448 | 4/1985 |
| CA | 1205097 | 5/1986 |
| CA | 12069779 | 7/1986 |
| CA | 2089019 | 6/1994 |
| CA | 2107971 | 6/1997 |

OTHER PUBLICATIONS

Starcrete Technologies Inc., "Sulfurcrete—The First Commercial Sulfur Concrete—A Technical Brief" undated (9 pages).

Vroom, Alan H., Vroom, Christopher H. and Hyne, James B., "Sulphur Polymer Concrete—A Corrosion–Resistant Materials for Middle East Construction" Oct. 16, 1995 (12 pages).

ASTM Designation c618–94a, "Standard Specification for Coal Fly Ash and Raw or Calcined Natural Pozzolan for Use as a Mineral Admixture in Portland Cement Concrete," Jul., 1994 pp. 304–306.

Hansson, Carolyn M., "Concrete: The Advanced Industrial Material of the 21st Century," *ASM International*, vol. 26A, Jun 1995, pp. 1321–1341.

"Sulfur Polymer Cement for Radioactive Waste Solidification and Stabilization," Excerpt from EGG–WM–10109 Feb. 1992 Report of Idaho National Engineering Lab, U.S. Department of Energy (1 Page).

Czarnecki, B., Thesis entitled "Durability of Sulphur Concrete," submitted to the Department of Civil Engineering University of Calgary, Calgary, Alberta dated Oct. 1987 (pages 1 , 3–31, 110–120, 286–300).

* cited by examiner

*Primary Examiner*—Mary Lynn Theisen
(74) *Attorney, Agent, or Firm*—Terrence N. Kuharchuk; Rodman & Rodman

(57) ABSTRACT

A synthetic aggregate and a process for converting a waste material into the synthetic aggregate. The synthetic aggregate includes a finely divided waste material and an amount of a sulphur binder for substantially coating the waste material such that the waste material is encapsulated therein The finely divided waste material acts as a stabilizer to stabilize the structure of the sulphur binder. The process comprises creating a molten sulphur binder. No chemical stabilizer is used. An amount of the waste material is mixed into the molten sulphur binder such that the waste material is substantially coated by the molten sulphur binder to produce an encapsulated waste material. The encapsulated waste material is separated into discrete particles having a size suitable for use as an aggregate to produce the synthetic aggregate. The molten sulphur binder is cooled to harden the encapsulated waste material.

9 Claims, No Drawings

SYNTHETIC AGGREGATE AND PROCESS FOR THE PRODUCTION THEREOF

This application is a continuation-in-part of U.S. patent application Ser. No. 09/017,772 filed Feb. 3, 1998 and now abandoned.

FIELD OF INVENTION

The present invention relates to a synthetic aggregate and a process for producing the synthetic aggregate. More particularly, the process of the invention is directed at converting a waste material into the synthetic aggregate utilizing a molten sulphur binder. The invention also relates to a process for immobilizing environmental contaminants and converting them into a physical state wherein they are non-hazardous to the environment.

BACKGROUND OF INVENTION

Numerous waste products or materials are generated by a variety of industries. These waste products include contaminated sand and soil, metallurgical slag, ash, saw dust, wood shavings and various other mineral and organic by-products generated by industries such as the oil and gas, petrochemical, mining, pulp and paper, timber and construction industries. Costly solutions are often required to address the treatment and disposal problems presented by such waste materials in order to ensure that such treatment or disposal occurs in a safe and effective manner.

Several options currently exist for dealing with these types of waste materials. First, the waste materials may be disposed of in sanitary landfills. However, this solution tends to be costly and may be environmentally undesirable due to the potential for the leaching of the wastes into the surrounding soil and groundwater. Second, these wastes may undergo washing or some form of chemical treatment aimed at de-contamination of the waste. This solution also tends to be costly and may result in the production of some amount of contaminated by-products, such as waste water, which similarly requires treatment prior to disposal. As well, the decontaminated waste, such as decontaminated soil waste, may have no use and therefore must typically be stockpiled in some fashion, taking up land space.

Finally, the waste material may be encapsulated using a Portland cement binder in order to produce a concrete-like mass. However, the use of Portland cement as a binder tends to be costly due to the materials used and the necessary processing requirements for Portland cement. In addition, the use of Portland cement may present difficulties when actually using the encapsulated materials for construction due to the relatively short time which is typically available for the delivery of the concrete to a potential construction site prior to the commencement of the setting of the concrete. In addition, environmental concerns continue to be raised with respect to the use of contaminated waste materials in Portland cement concrete when being used for construction purposes. Thus, such concrete is usually restricted by environmental regulations to industrial construction sites.

The treatment of sulphur-rich petroleum oil and natural gas products, as well as some ores, produces a voluminous amount of sulphur as a by-product. While there are available uses for sulphur, such as the manufacture of fertilizers, there has tended to be a substantial oversupply of sulphur resulting from the ever increasing desulphurization of primary products such as petroleum oil, natural gas and ores. As a result of environmental concerns due to potential contamination by sulphur stock-piled on site, safe, effective and cost efficient solutions are similarly required for the treatment or disposal of such sulphur.

One use of this sulphur has been the development of sulphur cements and concretes. Sulphur concretes are materials in which aggregate is bound together by elemental sulphur. The concretes are typically cast in the molten state and bonding occurs upon cooling of the molten mass as the sulphur crystallizes. It has been found that on solidifying from the molten state that elemental sulphur tends to be a relatively good binder for conventional aggregates such as sand, gravel and stone. The physical properties of the elemental sulphur have an effect upon the properties of the resulting sulphur concrete. Generally speaking, these properties tend to be superior to the properties found in Portland cement concrete. For instance, sulphur concrete typically displays rapid strength development, high strength (tensile, compressive, flexural and fatigue), low permeability, low thermal conductivity, low electrical conductivity and high corrosion and wear resistance. Further, these properties may be modified and improved by the inclusion of various modifiers or plasticizers in the sulphur cement or concrete to produce what is referred to as modified sulphur cements and concretes.

For instance, U. S. Pat. No. 4,134,775 issued Jan. 16, 1979 to Schwoegler describes the production of shaped articles from a dry blend composition containing "sulphur and a particulate solid additive inorganic material." The dry blend is heated to fuse the sulphur and then formed into the desired shape by extrusion or pelletization. The purpose of the Patent is produce a dry blend that does not settle or stratify during shipping and storage, thereby obviating the need for re-mixing of the blend when required to be used by the consumer. The dry blend maintains its uniformity until use by the consumer. U. S. Pat. No. 5,004,799 issued Apr. 2, 1991 to Kohls et. al. also describes the formation of modified sulphur concrete into discrete self-sustaining pellets which can be shipped and stored for indefinite periods and re-melted to yield usable concrete.

The purpose of these Patents is to render the sulphur or modified sulphur concrete more amenable to transport and storage. The Patents do not deal with the treatment or disposal of waste materials nor do they deal with the production of a synthetic aggregate from the compositions. U. S. Pat. No. 5,569,153 issued Oct. 29, 1996 to Mallow et. al. does describe a method of immobilizing toxic waste material by forming concrete shapes. However, the process and the resulting concrete shape require the use of hydraulic or Portland cement.

Specifically, a synthetic aggregate is first created from a pozzolana, a calcium hydroxide containing material, hydrothermal cement reactant, hydraulic cement and the toxic waste material. The waste material must be admixed with a liquid and used as a waste slurry in the mixture or sufficient water must be added to provide a moldable consistency of the mixture. The mixture is permitted to cure and is then formed into the aggregate by any typical grinding technique. The synthetic aggregate is then mixed with a modified sulphur cement, a pozzolana and sand to form a concrete product. As a result, the synthetic aggregate and process of this Patent tend to be costly and involve other disadvantageous features as discussed above due at least in part to the use of hydraulic cement therein.

U. S. Pat. No. 4,428,700 issued Jan. 31, 1984 to Lennemann describes the use of a modified sulphur cement or concrete as a barrier or backfill material for the containment of waste materials. In particular, a container of waste material, which is placed within an excavation, is surrounded by modified sulphur cement or concrete which has been placed in the molten state into the excavation around the container and then allowed to cool or harden. The Patent does not discuss or deal with the formation of a composition comprising the sulphur cement and the waste material, nor does it deal with the formation of a synthetic aggregate therefrom.

Therefore, there remains a need in the industry for a process for treating or otherwise dealing with waste materials in a relatively cost effective and environmentally safe manner as compared to conventional processes. In addition, the process preferably permits the utilization of sulphur which is presently produced in an abundant supply by various industrial processes. More particularly, there remains a need in the industry for a process for converting a waste material into a synthetic aggregate and a need for a synthetic aggregate so produced which man be used in the construction and other industries. Further, the process for converting the waste material into the synthetic aggregate preferably utilizes sulphur as a binder. Finally, there is a need for a process which utilizes sulphur to encapsulate the waste material and thereby produce a synthetic aggregate. Preferably, the synthetic aggregate will provide a replacement for conventional aggregate in construction, the production of which conventional aggregate tends to be costly, energy consuming and often environmentally undesirable.

SUMMARY OF INVENTION

The present invention relates to a process for treating or otherwise dealing with waste materials in a relatively cost effective and environmentally safe manner as compared to conventional processes. The process also preferably permits the utilization of sulphur which is presently produced as a by-product by various industrial processes. The present invention further relates to a process for converting a waste material into a synthetic aggregate and to the synthetic aggregate so produced. The process for converting the waste material into the synthetic aggregate preferably utilizes sulphur as a binder. Finally, the present invention relates to a process which utilizes a sulphur binder to encapsulate a waste material and thereby produce a synthetic aggregate.

In a first aspect of the invention, the invention relates to a process for converting a waste material into a synthetic aggregate. The process comprises the steps of:

(a) creating a molten sulphur binder;

(b) mixing an amount of the waste material into the molten sulphur binder such that the waste material is substantially coated by the molten sulphur binder to produce an encapsulated waste material;

(c) separating the encapsulated waste material into discrete particles having a size suitable for use as an aggregate to produce the synthetic aggregate; and (d) cooling the molten sulphur binder to harden the encapsulated waste material.

The process comprises preheating the waste material prior to the mixing step in order to minimize any cooling of the molten sulfur binder as a result of the mixing step. Preferably, the waste material is preheated to a temperature of about the temperature of the molten sulfur binder. More particularly, the waste material is preferably preheated to a temperature of between about 120 and 200 degrees Celsius.

Further, the cooling step may cool the molten sulphur binder to any temperature sufficient to harden the encapsulated waste material. However, preferably the cooling step comprises cooling the molten sulphur binder to a temperature of less than about 90 degrees Celsius. The cooling step may be performed at any time throughout the process as necessary to produce the hardened encapsulated waste material.

Finally, in the process, the separating step may comprise any conventional method or process for separating the encapsulated waste material into the desired discrete particles. However, preferably, the separating step comprises pelletizing the encapsulated waste material to produce the synthetic aggregate. Any conventional pelletizing process may be used. However, the pelletizing process preferably utilizes extrusion or rolling techniques.

In a second aspect of the invention, the invention relates to a synthetic aggregate. The synthetic aggregate comprises: a waste material; and an amount of a sulphur binder for substantially coating the waste material such that the waste material is encapsulated thereby.

The sulphur is stabilized by a portion of the waste material or by a mineral additive. The stabilizer comprises a portion of the waste material. Any mineral additive capable of having a stabilizing effect may be used. In a further alternative, the stabilizer may be comprised of slag, preferably a finely ground metallurgical slag. In a still further alternative, the stabilizer may be comprised of fly ash. No chemical stabilizer such as polymerized sulphur, or plasticizer such as cyclopentodiene is used. The synthetic aggregate is formed in the absence of a chemical stabilizer, polymerizer, or modifier.

The waste material may be comprised of any industrial waste product or by-product. Preferably, the waste material is comprised of any contaminated, toxic or hazardous waste product or by-product from the oil, gas, petrochemical, mining, pulp, paper, timber and construction industries. For instance, the waste material may be comprised of fly ash, contaminated sand from heavy oil production, contaminated soil, slag such as metallurgical slag, waste mill dusts such as precipitated steel mill dust, coal, petroleum coke, saw dust, wood shavings, and sludges containing pesticides.

DETAILED DESCRIPTION

The within invention is directed at a synthetic aggregate and a process for producing the synthetic aggregate. The process converts a waste material into the synthetic aggregate by encapsulating the waste material with a sulphur binder. Thus, the synthetic aggregate is comprised of the waste material and an amount of the sulphur binder.

The waste material is comprised of any material or product which conventionally requires treatment prior to its disposal or storage due to largely environmental concerns. In particular, the waste material will typically present concerns with respect to environmental contamination such as by the leaching of any toxic or hazardous substances to the environment. However, any material or product produced as waste or a by-product of any industrial process may be used. The waste material may be comprised of a single type of waste material or may be comprised of two or more types of waste material mixed together and used in combination to produce the synthetic aggregate. In addition, the waste material is used in a solid state, that is, as a substantially dry, finely divided material, in contrast to being utilized in a liquid state, as a waste slurry.

The finely divided waste materials preferably have the following particle size distribution: a minimum of 5%, by weight, of the particles must be less than 80 microns in size. Not more than 10%, by weight, of the particles should be greater than 1 in size. Not more than 5%, by weight, of the particles should be greater than 3 mm in size. Not more than 2%, by weight, of the particles should be greater than 5 mm in size. The finely divided particles are believed to facilitate the formation of the stable and durable crystal structure of the sulphur matrix.

The finely divided waste materials should have the aforementioned particle size distribution in order to provide sufficient stabilization to the synthetic aggregate. In the event the waste materials have larger particle sizes that are outside the range of the aforementioned particle size distribution, particle size reduction needs to be implemented to obtain the designated particle size distribution.

The waste material containing the environmental contaminants is preferably comprised of one or more of the following: contaminated sand, contaminated soil, non-metallurgical or metallurgical slag or coke, ash, fly ash, saw dust, wood shavings, produced sand and any mineral or organic by-products generated by industries such as the oil and gas, petrochemical, mining, pulp and paper, timber and construction industries. Produced sand is contaminated sand resulting from heavy oil production. More particularly, produced sand results from pumping operations where heavy or viscous oil is present in geological formations containing sand. Typically, produced sand may contain heavy metals, chlorides and light aromatic hydrocarbons including benzene and other carcinogens.

This invention targets a wide range of environmental contaminants contained in a variety of waste materials. These waste materials are more severely contaminated with environmental contaminants than materials previously utilized to make sulphur concrete. The environmental contaminants become immobilized within the synthetic aggregate and resistant to leaching, such that the synthetic aggregate is substantially environmentally nontoxic and in compliance with U.S. Environmental Protection Agency standards. Heavy metals and small amounts of chlorides are generally the only contaminants present in flyash and slag, which may be utilized in sulphur mortars and concretes. In addition to heavy metals and large amounts of chlorides, such environmental contaminants as carbon, silicones, hydrocarbons and pesticides are effectively treated and converted into environmentally nontoxic synthetic aggregate.

Larger particle size waste materials, on the order of at least about 5 mm do not present the same degree of environmental concern as the more finely divided waste materials on the order of less than about 1 mm. Thus, the larger particle size waste materials expose a lower surface area to leaching conditions, such as water run-off, than more finely divided waster materials which expose large surface areas to leaching conditions and consequently present a more severe threat of environmental contamination than larger particle size waste materials.

Conventional sulphur concrete, mortar and cement generally utilizes finely divided fillers such as silica flour, limestone, mica, diatomaceous earth, vermiculite and perlite. These materials usually do not contain substantial quantities, if any, of environmental contaminants. Chemical stabilizers, polymerizers and modifiers are also often included.

The waste materials in the present invention are contaminated, and generally have little or no value, In most cases, the waste materials are actually an environmental liability and costly disposal problem for the producer.

The amount of waste material used in this invention can vary from about 65 weight % to about 95 weight %, preferably about 70 weight % to about 90 weight %, of the synthetic aggregate. The amount of contaminant in the waste material can vary from about 0.2 weight % to about 95 weight %, and preferably about 2 weight % to about 90 weight %. The amount of environmental contaminants in the aggregate can vary from about 0.5 weight % to about 70 weight %, and preferably about 1 weight % to about 65 weight % of the synthetic aggregate.

The waste material is encapsulated within a sulphur binder. The sulphur binder is comprised of elemental sulphur. Typically, below about 90 degrees Celsius, crystallization of the sulphur occurs and there is a crystallographic conversion from the monoclinic to the more thermodynamically stable orthorhombic form. This conversion is typically complete in about 20 hours. The elemental sulphur may be obtained from any source. However, typically, the sulphur is a by-product of the de-sulphurization of petroleum oil, natural gas or ores.

The finely divided waste material with the designated particle size distribution acts to stabilize the structure of the sulphur binder in order to produce or maintain the desired properties in the synthetic aggregate. Specifically, the finely divided waste material stabilizer acts to minimize the formation of, or the reversion of the structure of the sulphur binder over time into, an unstable structure affecting the durability and other properties of the synthetic aggregate. More particularly, the finely divided waste material stabilizer preferably inhibits the formation of, or reversion into, crystals and minimizes the size of any crystals which are formed. It is believed that crystal growth may be restricted as the particles of the finely divided waste material stabilizer serve as nucleation sites inducing the formation of many small crystals instead of fewer larger ones. This is accomplished without the addition of a chemical stabilizer, such as polymeric or polymerized sulphur, or any modifier.

It has been found that the presence of larger or macro crystals in the sulphur binder tends to reduce the durability of the synthetic aggregate upon exposure to freezing-thawing cycles. Sulphur has a relatively high thermal expansion coefficient and a low thermal conductivity. Thus, when a sulphur binder containing adjacent macro crystals of sulphur undergoes temperature changes, movement is believed to occur between the macro crystals which may break or severely weaken the structure of the sulphur binder.

Thus, where the waste material is finely ground with the particle size distribution, already discussed, the finely ground waste material acts as the stabilizer. No chemical stabilizer is added.

It has further been found that the stabilizer may also be comprised of a finely ground mineral additive that preferably has the following particle size distribution: a minimum of 5%, by weight, of the particles must be less than 80 microns in size. Not more than 10%, by weight, of the particles should be greater than 1 mm in size. Not more than 5%, by weight, of the particles should be greater than 3 mm in size. Not more than 2%, by weight, of the particles should be greater than 5 mmn in size. The mineral additive may comprise finely ground metallurgical slag. Other specific finely ground materials or substances which have also been found to be useful as stabilizers include phosphoric gypsum, metallurgical slag, coke, fly ash and produced sand.

In addition, where necessary to enhance the strength or other properties of the synthetic aggregate, the synthetic aggregate may be further comprised of a filler. The filler may be any conventional material used in the production of cement or concrete which acts as a strength enhancing agent or reinforcing agent. Typically, such fillers are inert materials which provide a fibrous reinforcement to the cement. The filler may also modify the viscosity of the mix and thus reduce any tendency for separation and may reduce the required amount of binder by filling the voids between the particles of the waste material. For instance, the filler may be comprised of carbon fibers, steel fibers, glass fibers, wood fibers or other organic fibers. However, in the preferred embodiment, the filler is comprised of wollastonite. The filler content in the synthetic aggregate should generally be no more than about 20 weight %, and preferably no more than about 10 weight % of the synthetic aggregate.

The process for converting the waste material into the synthetic aggregate may be performed on either a batch or continuous basis. The process comprises the steps of creating a molten sulphur binder, mixing the waste material into the molten sulphur binder to produce an encapsulated waste material, separating the encapsulated waste material into discrete particles to produce the synthetic aggregate and cooling the molten sulphur binder to harden the encapsulated waste material and thereby produce a hardened synthetic aggregate.

The creating step includes heating the sulphur binder to a temperature greater than the melting point of sulphur to produce the molten sulphur binder. In particular, the sulphur binder is preferably heated to a temperature of equal to or greater than about 120 degrees Celsius such that the sulphur binder melts. In the preferred embodiment, the sulfur binder is heated to a temperature of between about 120 and 200 degrees Celsius. As described above, the sulphur binder is comprised of elemental sulphur.

The sulphur binder may be heated in or by any conventional heating device, vessel or apparatus or by any conventional heating method or process suitable for heating sulphur. In the preferred embodiment, the heating step is performed in a heating vessel wrapped with insulation to inhibit any heat loss therefrom. The temperature of the sulphur binder in the vessel may be monitored and controlled by any conventional temperature control or monitor. In the preferred embodiment, the heating element of the vessel is connected to a thermostat. In addition, one or more temperature sensors are installed and preferably connected to a digital temperature read-out device.

An amount of the waste material is then mixed into the molten sulphur binder. The mixing step is performed until the waste material is substantially coated by the molten sulphur binder such that the waste material is encapsulated by the molten sulphur binder. Thus, the mixing step produces an encapsulated waste material. In addition, the waste material is preferably substantially uniformly mixed into or throughout the molten sulphur binder such that a substantially uniform encapsulated waste material is produced. The coating or encapsulation of the waste material substantially binds and immobilizes the contaminants within the waste material. Thus, the encapsulation reduces or minimizes any potential for the leaching or escape of the waste material or the contaminants from the synthetic aggregate to the environment.

The mixing step may be performed by any conventional mixing device, vessel or apparatus or by any conventional mixing method or process capable of mixing the waste material into the molten sulphur binder in order to produce the encapsulated waste material.

In addition, the waste material may be pre-heated prior to the mixing of the waste material into the molten sulfur binder in order to minimize any cooling of the sulfur binder as a result of the mixing step. Thus the preheating of the waste material is beneficial from a practical standpoint in order to avoid any necessary reheating of the molten sulfur binder, as well as to assist in the reduction or elimination of any moisture in the mixture of the waste material and the molten sulfur binder, which moisture may lead to undesirable foaming of the mixture. However, this preheating step is considered to be preferred only.

Where the preheating step is performed, the waste material is preferably pre-heated to a temperature of about the temperature of the molten sulfur binder, which is preferably between about 120 and 200 degrees Celsius. In the event the addition of the waste material reduces the temperature of the molten sulfur binder, the resulting mixture of the waste material and the sulfur binder may need to be re-heated prior to the step of separating the encapsulated material into discrete particles depending upon the particular process or equipment utilized to perform the separating step.

As well, as indicated above, an effective amount of a filler may also be added to or mixed with the molten sulphur binder. The filler may be combined with the sulphur binder at any step or time within the process prior to the step of separating the encapsulated waste material into discrete particles in order to ensure that the filler is substantially uniformly mixed throughout the molten sulphur binder prior to producing the synthetic aggregate. For instance, the filler may be combined with the sulphur binder prior to heating the sulphur binder. Thus, the filler may simply be combined with the sulphur, prior to the step of creating the molten sulphur binder. The filler may be added and mixed into either the unmolten sulfur or the molten sulphur binder by any conventional mixing device, vessel or apparatus or by any conventional mixing method or process capable of mixing the filler into the unmolten sulfur or the molten sulphur binder, as required.

In addition, the filler may be preheated prior to combining the filler with the molten sulfur binder in order to minimize any cooling of the molten sulfur binder as a result of this combining step. Thus, as with the preheating of the waste material, the preheating of the filler is also beneficial from a practical standpoint in order to avoid any necessary reheating of the molten sulfur binder, to assist in the reduction or elimination of any moisture in the mixture of the waste material,. the filler and the molten sulfur binder and to minimize or reduce any undesirable foaming of the mixture. However, this preheating step is also considered to be preferred only.

Where the step of preheating the filler is performed, the filler is preferably preheated to a temperature of about the temperature of the molten sulfur binder. More preferably, the filler is preheated to a temperature of between about 120 and 200 degrees Celsius. Alternately, the filler may be preheated to a temperature higher than the desired temperature of the molten sulfur binder, but lower than the igniting temperature of the sulfur, and added to the unmolten sulfur in a uniform fashion to melt the sulfur.

The amount of the waste material to be mixed into the molten sulphur binder, and the relative proportions of the sulphur binder and the waste material, will vary depending upon various factors including the type of waste material used, the desired properties of the resulting synthetic aggregate, the desired workability of the mix, the particular process being used to perform the separating step and the temperature regime of the process.

A. Produced Sand Based Aggregates

| Mix Number | Composition |
| --- | --- |
| A.1 | Produced Sand (dried) - 65–80% (average-70%)<br>Sulfur - 20–35% |
| A.2 | Produced Sand - 70%<br>Sulfur - 30% |
| A.3 | Produced Sand - 65%<br>Fly Ash - 5%<br>Sulfur - 30% |
| A.4 | Produced Sand - 70%<br>Fly Ash - 5%<br>Sulfur - 25% |
| A.5 | Produced Sand - 70%<br>Phosphogypsum - 5%<br>Sulfur - 25% |
| A.6 | Produced Sand - 66%<br>Ground Slag - 5%<br>Sulfur - 29% |

B. Slag/Fly Ash Based Aggregates

| Mix Number | Composition |
| --- | --- |
| B.1 | Barren Slag - 35%<br>Ground Slag - 42%<br>Sulfur - 23% |
| B.2 | Barren Slag - 51%<br>Fly Ash - 29%<br>Sulfur - 20% |
| B.3 | Ground Slag - 70%<br>Fly Ash - 5%<br>Sulfur - 25% |

Notes

All of the aggregates produced from these mixes were produced through extrusion pelletizing Further mixes used in testing shaking or rolling pelletizers were either:
(a) Produced Sand—70% Sulfur—30%; or
(b) Produced Sand—75% Sulfur—25%

The mix temperature range for shaking or rolling pelletizers is between about 130–170 degrees Celsius.

Following the production of the encapsulated waste material, the encapsulated waste material is separated into discrete particles having a size or sizes suitable for use as an aggregate to produce the synthetic aggregate. The size and shape of each discrete particle formed by the separating step need not be the same. In other words, the size and shape of the discrete particles need not be uniform as long as the size and shape of each discrete particle is suitable for use as an aggregate. Further, as long as the size or sizes of the discrete particles are suitable for use as an aggregate, the actual particle size may vary depending upon the desired use or uses of the synthetic aggregate.

Any conventional device, apparatus, method or process capable of separating the encapsulated waste material into discrete particles having the desired size may be used. However, in the preferred embodiment, the separating step is comprised of pelletizing the encapsulated waste material to produce the synthetic aggregate. Most conventional pelletizing apparatuses and any conventional pelletizing processes may be used. However, preferably, such apparatuses or processes use extrusion or rolling techniques.

Finally, the process is also comprised of cooling the molten sulphur binder to harden the encapsulated waste material. As a result, a hardened synthetic aggregate, ready for use, is formed. The molten sulphur binder may be cooled to any temperature permitting the hardening of the encapsulated waste material, and in particular the hardening of the sulphur binder coating the waste material. However, preferably the molten sulphur binder is cooled to a temperature of less than about 90 degrees Celsius. The cooling step may be performed actively, by any conventional cooling device, apparatus, method or process, or passively by simply permitting the heat to dissipate from the sulphur binder.

The cooling step may be performed at any time following the production of the encapsulated waste material by the mixing step. In the preferred embodiment in which the encapsulated waste material is pelletized, the cooling step may partially occur prior to the pelletization so that the encapsulated waste material has a consistency compatible with the pelletization process. In addition, the synthetic aggregate will tend to have a consistency suitable for pelletization due to the relatively high amounts of finely divided waste material that are used to form the synthetic aggregate. Furthermore, the pelletization process may cool the molten sulphur binder during the pelletization to form the discrete particles. Finally, the sulphur binder may be adequately cooled during the pelletization to produce a hardened synthetic aggregate ready for transport or storage. However, alternately, the sulphur binder may require further cooling following the pelletization process.

In the preferred embodiment, one pelletizer includes a hopper inlet, a casing chamber with a rotating screw conveyor and a stationary perforated dye at the end of the casing. Following the preparation of the encapsulated waste material, the encapsulated waste material is transferred to the pelletizer. Once in the pelletizer, the encapsulated waste material is conveyed through the pelletizer by turning the handle of the rotating screw conveyor towards the perforated dye. As the encapsulated waste material is squeezed through the perforated dye, the sulphur binder, and thus the encapsulated waste material, are cooled by spraying water on the outside of the dye. As a result, the encapsulated waste material is formed into discrete particles, being hard cylindrical pellets, which break off at the dye face. The pellets or synthetic aggregate are produced ready for handling and do not require any further cooling.

Alternately, the pelletizer may include a preferably sloped flat or corrugated sheet attached to a vibrator. The encapsulated waste material is discharged on the sheet and separated into discrete particles which then roll along the sloped sheet forming the pellets. In a further alternative, the pelletizer may include a rotating drum preferably sloped along its axis. The encapsulated waste material is discharged into the drum and separated into discrete particles which then roll into pellets.

The resulting synthetic aggregate tends to be relatively strong and durable as compared to other natural and synthetic aggregates. In addition, the synthetic aggregate prevents, or at least minimizes, the leaching of any contaminants from the waste material. As well, the synthetic aggregate has been found to have lower electric and thermal conductivities than most natural aggregates, and in particular natural gravel. These qualities are thought to occur as sulphur tends to be both a dielectric and an insulator. Finally, the synthetic aggregate may be crushed, remelted and reformed as desired or required for any particular application without any substantial loss of strength or other properties of the synthetic aggregate.

Accordingly, one of the specific applications of the synthetic aggregate is its use in the construction industry. For instance, its lower electrical conductivity may be beneficial in the use of the synthetic aggregate as a base cover for electrical substations. As well, the lower thermal conductivity may be beneficial in the use of the synthetic aggregate for backfilling trenches with water pipes to protect them from freezing or for road sub-base or foundation construction to prevent frost heave action on pavements or foundations.

The synthetic aggregate is quite effective in immobilizing environmental contaminants and is uniquely suited for a variety of construction applications, including an aggregate for Portland cement concrete, asphalt paving materials, compactible gravel fill for road foundations or road sub-bases. The particle size of the synthetic aggregate can vary from about 50 microns up to about 100 mm, preferably about 150 microns to about 25 mm depending on the application. Fine aggregate such as sand, generally varies from above about 150 microns to about 5 mm. Coarse aggregate such as gravel used in asphalt generally varies from about 300 microns to about 25 mm.

The synthetic aggregate of the present invention is better in quality than state-of-the-art aggregates in terms of hardness, strength and overall durability.

The following examples and tables provide test results and data which serve more fully to illustrate the invention.

TABLE 1

Contaminant Content of Flyash

| Contaminant | Fly Ash* (ppm) | Fly Ash* (%, by weight) |
|---|---|---|
| barium, Ba | 10000 | 1 |
| beryllium, (as BeO) | 2 | 0.0002 |
| boron, B | 500 | 0.05 |
| chromium, Cr | 50 | 0.005 |
| copper, Cu | 20 | 0.002 |
| gallium, Ga | 50 | 0.005 |
| lead, Pb | 200 | 0.02 |
| manganese, Mn | 100 | 0.01 |
| molybdenum, Mo | 20 | 0.002 |
| nickel, Ni | 20 | 0.002 |
| strontium, Sr | 3000 | 0.3 |
| yttrium (as Y2O3) | 20 | 0.002 |
| zirconium (as ZrO2) | 200 | 0.02 |
| Total Contaminants (%, by weight of flyash) | | 1.42 |

*Semi-quantitative spectrographic analysis of a typical, Class F coal fly ash, produced in Alberta.

TABLE 2

Contaminant Content of Slag

| Contaminant | Slag** (ppm) | Slag** (%, by weight) |
|---|---|---|
| barium, Ba | 3000 | 0.3 |
| chromium, Cr | 590 | 0.059 |
| copper, Cu | 6000 | 0.6 |
| lead, Pb | 900 | 0.09 |
| manganese, Mn | 8000 | 0.8 |
| nickel, Ni | 50 | 0.005 |
| strontium, Sr | 1000 | 0.1 |
| zinc, Zn | 26000 | 2.6 |
| arsenic, As | 200 | 0.02 |
| cadmium, Cd | 6 | 0.0006 |
| germanium, Ge | 70 | 0.007 |
| tin, Sn | 300 | 0.03 |

TABLE 2-continued

Contaminant Content of Slag

| Contaminant | Slag** (ppm) | Slag** (%, by weight) |
|---|---|---|
| antimony, Sb | 200 | 0.02 |
| cobalt, Co | 200 | 0.02 |
| thallium, Tl | 10 | 0.001 |
| chloride, Cl | 20 | 0.002 |
| Total Contaminants (%, by weight of slag) | | 4.65 |

**Analysis of a heavily contaminated metallurgical slag

TABLE 3

Contaminant Content of Waste Sand and Synthetic Aggregate from Waste Sand.

| Contaminant | Waste Sand* (ppm) | Waste Sand* (%, by weight of sand) | Aggregate** (%, by weight of aggregate) |
|---|---|---|---|
| Hydrocarbons (C6 to C 30+) | 17900 | 1.79 | 1.253 |
| chloride, Cl | 1260 | 0.126 | 0.0882 |
| trace metals*** | 27 | 0.0027 | 0.00189 |
| Total Contaminants (%, by weight of waste sand and agg.) | | 1.92 | 1.34 |

*Analysis of a contaminated, waste sand from heavy oil production in Alberta (produced sand).
**Contaminant content is based on an aggregate mix design of 70% waste sand, 30% sulphur, by weight.
***Metals analyzed: cadmium, mercury, nickel, zinc, lead, copper.
The majority of the chlorides present are in the form of sodium chloride (NaCl).

TABLE 4

Contaminant Content of Petroleum Coke Waste, Waste Sand and Synthetic Aggregate from Petroleum Coke Waste and Waste Sand

| Contaminant | Petroleum Coke* (%, by weight of Pet. Coke) | Waste Sand** (%, by weight of Sand) | Aggregate*** (%, by weight of Agg.) |
|---|---|---|---|
| carbon, C | 88 | NA | 52.8 |
| silicone | 2 | NA | 1.2 |
| trace metals and PAH's | 2 | NA | 1.2 |
| Hydrocarbons (C6 to C30+) | NA | 1.79 | 0.0895 |
| Chloride, Cl | NA | 0.126 | 0.0063 |
| trace metals | NA | 0.0027 | 0.0001 |
| Total Contaminants (%, by weight, of wastes and aggregate) | 92 | 1.92 | 55.30 |

*Petroleum coke is a waste produced from oilsands refining.
**Analysis of a contaminated, waste sand from heavy oil production in Alberto (produced sand).
***Contaminant content is based on a synthetic aggregate mix design of 60% pet. Coke, 5% waste sand, and 35% sulphur, by weight.

TABLE 5

Contaminant Content of Italian Wastes and Synthetic Aggregate from Italian Wastes and Waste Sand.

| Parameter | Waste Sand (%, by weight) | Waste Sludge (A) (%, by weight) | Aggregate from Waste Sludge (A) and Waste Sand (%, by weight of Agg.)[1] | Waste Sludge (B) %, by weight) | Aggregate from Waste Sludge (B) and Waste Sand (%, by weight of agg.)[2] |
|---|---|---|---|---|---|
| Total Pesticides | NA | 0.3 | 0.14 | 0.03 | 0.015 |
| Metals | | | | | |
| antimony (Sb) | NA | NA | NA | NA | NA |
| arsenic (As) | NA | 0.125 | 0.0563 | 0.00326 | 0.00163 |
| barium (Ba) | NA | 0.0619 | 0.0279 | 0.316 | 0.158 |
| beryllium (Be) | NA | 0.00003 | 0.000014 | 0.00022 | 0.00011 |
| boron (B) | NA | 0.000064 | 0.000029 | 0.000672 | 0.000336 |
| cadmium (Cd) | 0.00001 | 0.000153 | 0.00007 | 0.00028 | 0.000142 |
| chromium (Cr) | NA | 0.0107 | 0.004815 | 0.00566 | 0.00283 |
| chromium, hex ($Cr^{+6}$) | NA | 0.000003 | 0.000001 | 0.000003 | 0.0000015 |
| cobalt (Co) | NA | 0.00118 | 0.000531 | 0.00849 | 0.0042 |
| copper (Cu) | 0.0002 | 0.0119 | 0.00541 | 0.02 | 0.011 |
| cyanide (water soluble) | NA | NA | NA | NA | NA |
| lead (Pb) | 0.0002 | 0.0482 | 0.02174 | 0.0207 | 0.013 |
| manganese (Mn) | NA | NA | NA | NA | NA |
| mercury, total (Hg) | 0.000001 | 0.0413 | 0.01859 | 0.00699 | 0.003 |
| molybdenum (Mo) | NA | 0.00003 | 0.000014 | 0.00154 | 0.0008 |
| nickel (Ni) | 0.0006 | 0.00687 | 0.00324 | 0.00242 | 0.001 |
| selenium (Se) | NA | 0.0005 | 0.000225 | 0.0001 | 0.0001 |
| silver (Ag) | NA | NA | NA | NA | NA |
| tin (Sn) | NA | NA | NA | NA | NA |
| thallium (Tl) | NA | 0.000374 | 0.000168 | 0.000042 | 0.000021 |
| uranium (U) | NA | NA | NA | NA | NA |
| vanadium (V) | NA | 0.00633 | 0.002849 | 0.00239 | 0.0012 |
| zinc (Zn) | 0.00171 | 0.0381 | 0.01757 | 0.089 | 0.045 |
| zirconium (Zr) | NA | NA | NA | NA | NA |
| chloride, Cl | 0.126 | NA | 0.03 | NA | 0.0189 |
| Hydrocarbons (C6 to C30+) | 1.79 | NA | 0.45 | NA | 0.2685 |
| Total Contaminants (%, by weight of waste and aggregate) | 1.92 | 0.65 | 0.77 | 0.52 | 0.55 |

| Parameter | Waste Sand (%, by weight) | Waste Mill Dust (C) (%, by weight) | Aggregate from Waste Mill Dust and Waste Sand (%, by weight of aggregate)[3] |
|---|---|---|---|
| Total Pesticides | NA | NA | NA |
| Metals | | | |
| antimony (Sb) | NA | NA | NA |
| arsenic (As) | NA | 0.00177 | 0.000443 |
| barium (Ba) | NA | 0.00771 | 0.001928 |
| beryllium (Be) | NA | 0.0001 | 0.000025 |
| boron (B) | NA | 0.00076 | 0.000190 |
| cadmium (Cd) | 0.00001 | 0.0122 | 0.0031 |
| chromium (Cr) | NA | 0.0845 | 0.0211 |
| chromium, hex ($Cr^{+6}$) | NA | 0.000003 | 0.000001 |
| cobalt (Co) | NA | 0.0008 | 0.0002 |
| copper (Cu) | 0.0002 | 0.0708 | 0.0178 |
| cyanide (water soluble) | NA | 0.00005 | 0.000013 |
| lead (Pb) | 0.0002 | 1.62 | 0.405 |
| manganese (Mn) | NA | NA | NA |
| mercury, total (Hg) | 0.000001 | 0.000121 | 0.000031 |
| molybdenum (Mo) | NA | 0.0018 | 0.0005 |
| nickel (Ni) | 0.0006 | 0.0095 | 0.002675 |
| selenium (Se) | NA | 0.00018 | 0.000045 |
| silver (Ag) | NA | 0.0002 | 0.000050 |
| tin (Sn) | NA | 0.0055 | 0.001375 |
| thallium (Tl) | NA | 0.0001 | 0.000025 |
| uranium (U) | NA | NA | NA |
| vanadium (V) | NA | 0.0023 | 0.000575 |
| zinc (Zn) | 0.00171 | 8.08 | 2.02 |

TABLE 5-continued

Contaminant Content of Italian Wastes and Synthetic Aggregate from Italian Wastes and Waste Sand.

| | | | |
|---|---|---|---|
| zirconium (Zr) | NA | NA | NA |
| chloride, Cl | 0.126 | NA | 0.06 |
| Hydrocarbons (C6 to C30+) | 1.79 | NA | 0.90 |
| Total Contaminants (%, by weight of waste and aggregate) | 1.92 | 9.90 | 3.43 |

Note: NA—Not Applicable
[1]Concentration of contaminant is based on a synthetic aggregate mix design of 45% waste sludge (A), 25% waste sand and 30% sulphur.
[2]Concentration of contaminant is based on a synthetic aggregate mix design of 50% waste sludge (B), 15% waste sand, and 35% sulphur.
[3]Concentration of contaminant is based on a synthetic aggregate mix design of 25% waste mill dust (C), 50% waste sand, 25% sulphur.

TABLE 6

Contaminant Content Comparison of Synthetic Aggregate and Sulphur "Mortar" Containing Flyash

| | Contaminant Content (by weight of material) | |
|---|---|---|
| Contaminant | Sulphur "Mortar" with Flyash (%, by weight)[1] | Synthetic Aggregate (%, by weight) |
| chromium, (Cr) | <0.0030 | 0.0211[2] |
| nickel, (Ni) | <0.0012 | 0.0032[3] |
| lead, (Pb) | 0.012 | 0.405[2] |
| copper, (Cu) | 0.0012 | 0.0178[2] |

[1]Contaminant content in mortar is based on the chemical analysis in Table 1 Contaminant content in mortar assumes a theoretical, maximum flyash content of 60%, by weight of mortar.
[2]Contaminant content in synthetic aggregate produced from waste mill dust (C), see Table 5
[3]Contaminant content in synthetic aggregate produced from waste sludge (A), see Table 5.

TABLE 7

Contaminant Content Comparison of Synthetic Aggregate and Sulphur Concrete Containing Slag

| | Contaminant Content (by weight of material) | |
|---|---|---|
| Contaminant | Sulphur Concrete with Slag (%, by weight)[1] | Synthetic Aggregate (%, by weight) |
| cadmium, (Cd) | 0.00048 | 0.0031[2] |
| lead, (Pb) | 0.072 | 0.405[2] |
| arsenic, (As) | 0.016 | 0.0563[3] |
| chloride, (Cl) | 0.0016 | 0.0882[4] |

[1]Contaminant content in concrete is based on the baseline slag chemical analysis presented in Table 2. Contaminant content in concrete assumes a maximum slag content of 80%, by weight of concrete.
[2]Contaminant content in synthetic aggregate produced from waste mill dust (C), see Table 5.
[3]Contaminant content in synthetic aggregate produced from waste sludge (A), see Table 5.
[4]Contaminant content in synthetic aggregate produced from waste sand, see Table 3.

TABLE 8

Leachability Assessment of Synthetic Aggregate Containing Heavily Contaminated Steelmill Dust

| Parameter | Waste Mill Dust (C) (%, by weight) | Waste Mill Dust (C) (ppm) | Leachate from Synthetic Agg. Containing Waste Mill Dust (C) (mg/L)[1] | Italian Residential/ Agricultural Criteria (ppm) or (mg/L)[2] |
|---|---|---|---|---|
| Total Pesticides | NA | NA | NA | 0.001 |
| antimony (Sb) | NA | NA | <0.2 | 20.0 |
| arsenic (As) | 0.00177 | 17.7 | <0.2 | 20.0 |
| barium (Ba) | 0.00771 | 77.1 | 0.45 | 700 |
| beryllium (Be) | 0.0001 | <1.0 | <0.01 | 4.00 |
| boron (B) | 0.00076 | 7.6 | 0.48 | NA |
| cadmium (Cd) | 0.0122 | 122 | 0.79 | 3.00 |
| chromium (Cr) | 0.0845 | 845 | 0.02 | 100 |
| chromium, hex. ($Cr^{+6}$) | 0.000003 | 0.03 | <0.1 | 5.00 |
| cobalt (Co) | 0.0008 | 8.00 | <0.01 | 40.0 |
| copper (Cu) | 0.0708 | 708 | 0.02 | 100 |
| cyanide (water soluble) | 0.00005 | <0.5 | NA | Complex (50)/Free (10) |
| lead (Pb) | 1.62 | 16,200 | 30.9 | 100 |
| manganese (Mn) | NA | NA | 3.46 | NA |
| mercury, total (Hg) | 0.000121 | 1.21 | <0.1 | 1.00 |
| molybdenum (Mo) | 0.0018 | 18.0 | <0.01 | 10.0 |
| nickel (Ni) | 0.0095 | 95.0 | 0.04 | 150 |
| selenium (Se) | 0.00018 | 1.80 | <0.2 | 3.00 |

TABLE 8-continued

Leachability Assessment of Synthetic Aggregate Containing Heavily Contaminated Steelmill Dust

| Parameter | Waste Mill Dust (C) (%, by weight) | Waste Mill Dust (C) (ppm) | Leachate from Synthetic Agg. Containing Waste Mill Dust (C) (mg/L)[1] | Italian Residential/ Agricultural Criteria (ppm) or (mg/L)[2] |
|---|---|---|---|---|
| silver (Ag) | 0.0002 | 2.00 | 0.01 | 20.0 |
| tin (Sn) | 0.0055 | 55.0 | <0.05 | 50.0 |
| thallium (Tl) | 0.0001 | <1.0 | 0.06 | 1.00 |
| uranium (U) | NA | NA | <0.2 | NA |
| vanadium (V) | 0.0023 | 23.0 | <0.01 | 200 |
| zinc (Zn) | 8.08 | 80,800 | 33.5 | 300 |
| zirconium (Zr) | NA | NA | <0.1 | NA |

Notes
NA-Not Applicable
[1] Synthetic Aggregate mix design of 25%, waste mill dust (C), 50% waste sand, 25% Sulphur (see Table 5). Leachate extracted as per TCLP Method (EPA SW-846, Method #: 1311).
[2] Regulatory criteria is applied to the dispersible material in question (waste dust or synthetic aggregate leachate)

TABLE 9

Alberta Transportation and Utilities (AT & U) Aggregate Gradation Specifications

| | AT&U Spec. for Asphalt Concrete Pavement (Designation 1, Class 16). | | AT&U Spec. for Pit-Run Gravel Fill (Designation 6, Class 80) | |
|---|---|---|---|---|
| Sieve Size (mm) | Min. % Passing | Max. % Passing | Min. % Passing | Max. % Passing |
| 80 | 100 | 100 | 100 | 100 |
| 50 | 100 | 100 | 55 | 100 |
| 40 | 100 | 100 | | |
| 25 | 100 | 100 | 38 | 100 |
| 20 | 100 | 100 | | |
| 16 | 100 | 100 | 32 | 85 |
| 12.5 | 80 | 92 | | |
| 10 | 70 | 84 | | |
| 5 | 50 | 65 | 20 | 65 |
| 1.250 | 26 | 45 | | |
| 0.630 | 18 | 38 | | |
| 0.315 | 12 | 30 | 6 | 30 |
| 0.160 | 8 | 20 | | |
| 0.080 | 4 | 10 | 2 | 10 |

Alberta Transportation and Utilities is the government body responsible for public works construction specifications in Alberta. Table 9 provides Alberta aggregate graduation specifications for two construction applications.

Firstly, a gradation specification for an aggregate used in asphalt paving materials provided. The second specification is for so-called "Pit-Run" aggregate. Pit-run gravel is a high-bearing capacity, compactible gravel fill used typically as a foundation road sub-base.

The present invention is capable of producing synthetic aggregate meeting these graduations. Furthermore, the synthetic aggregate gradation is not limited to these gradations. Additional variability in the aggregate gradation is possible, depending on the application.

Leachate Tests

The leachate tests were performed to determine the leaching of various contaminants from untreated produced sand as compared to the synthetic aggregate. The produced sand was obtained from the Norcen Energy site in Elk Point, Alberta, Canada. The synthetic aggregate was produced utilizing the produced sand as the waste material. In addition, the synthetic aggregate was prepared from the following:

sulphur—30 % by weight
waste material (produced sand)—70 % by weight

The leachate tests were performed in accordance with Method No. 1311, "Toxicity Characteristic Leaching Procedure" (TCLP), United States Environmental Protection Agency (USEPA) Module SW-846 (Update I, July 1992.). The leachate data appears in Table 8 and illustrates the effectiveness of the synthetic aggregate matrix to immobilize heavy metal contaminants, thereby minimizing the ability of the waste material to contaminate the environment. In essence, the data demonstrates that the synthetic aggregate produced by the present invention is substantially environmentally non-toxic.

Strength Tests

The strength tests were performed by forming mass test cubes, which were then used to determine compressive strength upon destroying the cubes in a compression tester. Strength results related to some of the compositions from which synthetic aggregate was produced, as outlined above, are as follows:

TABLE 10

Strength Results

| Mix Number | Average Strength (MPa) |
|---|---|
| A.1 | 14.0 |
| A.4 | 20.2 |
| A.6 | 19.3 |

Notes
Results for Mix A.1 were averaged over the strength of 9 cubes with a minimum of 7.4 MPa and a maximum of 19.0 MPa.
results for Mix A.4 were averaged over the strength of 6 cubes with a minimum of 17.6 MPa and a maximum of 24.4 MPa.
Results for Mix A.6 were averaged over the strength of 6 cubes with a minimum of 16.4 MPa and a maximum of 21.8 MPa.
All values were 24 hour strengths.

Durability Tests

The durability tests were performed by subjecting the test specimens (actual synthetic aggregate) to numerous freeze-thaw cycles. The particulars of the materials and mix parameters for these tests are as follows:

(a) Testing Procedure
1. 190 grams of synthetic aggregate, 5–15 mm in size, is placed in a 1.5 inches×3.0 inches×2.0 inches plastic container.
2. The synthetic aggregate undergoes one freeze-thaw cycle every 24 hours. The cycle is induced by submerging the aggregate in tapwater for 9.0 hours, draining the water from the sample and placing the sample in a freezer for the next 15. 0 hours. Five cycles are achieved each week.
3. For the purposes of this invention, each week the samples are qualitatively examined and compared to a control group of aggregates that have not undergone freeze-thaw cycling. In addition, another control group aggregate has been tested which is a synthetic aggregate produced from expanded slate, a material which has been on the market for several decades.
4. The aggregate samples are subjected to the following hand tests:
   Test (a)—scratching to evaluate surface integrity;
   Test (b)—rolling over corners and edges attempting to break off pieces of aggregate; and
   Test (c)—attempting to shear aggregate pieces manually to evaluate strength loss.
5. It should be noted that the durability tests performed were qualitative only and were not standard durability tests. It is anticipated that once a specific process and synthetic aggregate are selected for commercial application that standard durability tests will be conducted on the synthetic aggregate.

(b) Testing Results

Eleven different synthetic aggregate samples were subjected to freeze-thaw testing. The majority were produced by extrusion pelletizing and crushing, but two samples were produced by crushing sheets of material and one sample was produced by plate-vibration pelletizing.

A rating system with a scale of 1 to 5 was used to evaluate degradation under freeze-thaw testing. The aggregate received a rating for each of the three hand tests (a)–(c) previously described. A "5" corresponded to the undiminished properties of the control sample which had undergone no cycling. A "1" corresponded to a badly deteriorated sample which crumbles under moderate finger pressure.

The number of cycles listed is the point at which deterioration was first noticed. However, the test results set out below reflect the current status of ongoing durability tests with respect to some of the mixes. Therefore, where testing is ongoing and no degradation or deterioration has been noted to date, the number of cycles to deterioration is not specifically provided. Rather, the test results merely indicate the number of cycles conducted to date.

Strength results related to some of the compositions from which synthetic aggregate was produced, as outlined previously, are as follows:

TABLE 11

Results of Freeze-Thaw Cycling Durability Tests

| Mix No. | No. of Cycles | Test (a) Rating | Test (b) Rating | Test (c) Rating | Observations |
|---|---|---|---|---|---|
| A.1* | 35 | 4 | 3 | 5 | aggregate appears to be becoming slightly crumbly at the corners but is still maintaining overall integrity and strength |
| A.2 | 35 | 4 | 4 | 4 | aggregate becoming "softer" and more crumbly |
| A.4 | 45 | 5 | 4 | 4 | aggregate noticeably harder (more difficult to scratch) than mixes A.1 and A.2; aggregate more prone to shear into halves rather than crumble |
| A.5 | 25 | 3 | 3 | 3 | aggregate deteriorated quickly, was crumbly and weak to begin with; aggregate with phosphogypsum is weak under freeze-thaw |
| A.6 | 45 | 5 | 4 | 4 | very similar to mix A.4; aggregate was noticeably harder than others; not crumbly but tended to shear more easily than control sample |
| B.1 | — | 5 | 5 | 5 | no degradation noticed after 55 cycles; very strong and hard aggregate |
| B.2 | 40 | 4 | 3 | 4 | initially hard and strong; although aggregate is still hard and has maintained its integrity, it has become more crumbly around the edges and corners; some strength loss is evident as aggregate is more easily sheared |
| B.3 | — | 5 | 5 | 5 | no deterioration after 45 cycles; very hard and strong aggregate |
| A.7* | 20 | 2 | 2 | 2 | aggregate became crumbly, soft and weak very quickly; very poor freeze-thaw durability |
| A.8* | 30 | 3 | 2 | 2 | aggregate was originally very hard; aggregate tended to fracture into small pieces after 35 cycles |
| A.9* | — | 5 | 5 | 5 | no deterioration noticed after 27 cycles; rounded aggregate (not angular like other samples) |

Notes: A.1* - mix of 70% Produced Sand and 30% Sulfur
A.7* - mix of 70% Produced Sand and 30% Sulfur (crushed unconsolidated quenched sheets)
A.8* - mix of 70% Produced Sand and 30% Sulfur (crushed vibrated quenched sheets)
A.9* - mix of 70% Produced Sand and 30% Sulfur (aggregate formed from a vibrating trough)

(c) Test Summary

Ranking of aggregates according to freeze-thaw durability (in declining order of durability):
Produced Sand Based Aggregates:
1. Mixes A.9, A.6 and A.4
2. Mixes A.1 and A.2
3. Mix A.8
4. Mixes A.7 and A.5
Slag/Flyash Based Aggregates:
1. Mixes B.1 and B.3
2. Mix B.2

The embodiments of the invention in which an exclusive privilege or property is claimed are defined as follows:

1. A process for converting environmental contaminants present in finely divided waste materials into an environmentally non-toxic synthetic aggregate, wherein the finely divided waste material comprises at least 65 weight % of said synthetic aggregate, and wherein the environmental contaminants are selected from the group consisting of hydrocarbons, heavy metals, chlorides, carbon, pesticides, and mixtures thereof, the process comprising:

(a) selecting the waste material so that it has the following particle size distribution:
   (i) a minimum of 5 weight % having a particle size less than about 80 microns;
   (ii) not more than 10 weight % having a particle size greater than 1 mm;
   (iii) not more than 5 weight % having a particle size greater than 3 mm;
   (iv) not more than 2 weight % having a particle size greater than 5 mm;
(b) preheating elemental sulfur to form a molten sulfur binder;
(c) preheating the waste material to substantially the same temperature as the molten sulfur binder;
(d) contacting the preheated waste material with the molten sulfur binder in the absence of a chemical stabilizer to form a molten composition of the waste material encapsulated within the sulfur binder;
(e) separating the molten composition into discrete particles to thereby form the synthetic aggregate, wherein the environmental contaminants are immobilized within the synthetic aggregate, and wherein the synthetic aggregate is substantially environmentally non-toxic.

2. The process of claim 1, wherein the particle size of the synthetic aggregate varies from about 50 microns to about 100 mm.

3. The process of claim 1, wherein the waste material comprises about 70 weight % to about 90 weight % of the synthetic aggregate.

4. The process of claim 1, wherein the elemental sulfur binder comprises about 5 weight % to about 35 weight % of the synthetic aggregate.

5. The process of claim 1, wherein the waste material is selected from the group consisting of fly ash, contaminated sand from heavy oil production, contaminated soil, slag, waste mill dust, precipitated steel mill dust, coal, petroleum coke, saw dust, wood shavings, and sludges containing pesticides.

6. The process of claim 1, wherein the waste material is a mineral or organic by-product derived from industries selected from the group consisting of oil, gas, petrochemical, mining, pulp, paper, timber and construction.

7. The process of claim 1, wherein the molten sulfur is heated to a temperature of about 120° C. to about 200° C.

8. The process of claim 1, wherein the waste material is preheated to a temperature of about 120° C. to about 200 ° C.

9. The process of claim 1, wherein the environmental contaminants comprise about 0.5 weight % to about 70 weight % of the synthetic aggregate.

* * * * *